(12) United States Patent
Horner et al.

(10) Patent No.: US 6,327,958 B1
(45) Date of Patent: Dec. 11, 2001

(54) BRAKE BOOSTER AND ITS METHOD OF ASSEMBLY

(75) Inventors: Charles Byron Horner, South Bend; Wayne Allen Hewitt, LaPorte, both of IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/628,641

(22) Filed: Jul. 31, 2000

(51) Int. Cl.[7] ........................................................ F15B 9/10
(52) U.S. Cl. ................................................................ 091/369.2
(58) Field of Search ........................... 91/369.2, 369.3, 91/376 R

(56) References Cited

U.S. PATENT DOCUMENTS 4,898,073 * 2/1990 Seip et al. ............................ 91/369.2

* cited by examiner

*Primary Examiner*—Edward K. Look
*Assistant Examiner*—Michael Leslie
(74) *Attorney, Agent, or Firm*—Leo H. McCormick, Jr.; Warren Comstock

(57) ABSTRACT

A brake booster and a method of assembling an output member thereof within a bore of a valve body. In this brake booster, a reaction disc engages a holder of a reaction transmitting assembly which is connected to a plunger of an input member. A guide is attached to a cylindrical head on a shaft of an output member by hooks on the end of a first plurality of legs that extend in a first direction from a cylindrical base. A second plurality of axial legs that extend from the cylindrical base in a second direction are connected to a support ring. The cylindrical base is located in the bore by the support ring being positioned on a shoulder in the valve body by a return spring such that a series of arcuate tabs on the cylindrical base urge a reaction disc retained by the cylindrical head into engagement with the holder.

8 Claims, 1 Drawing Sheet

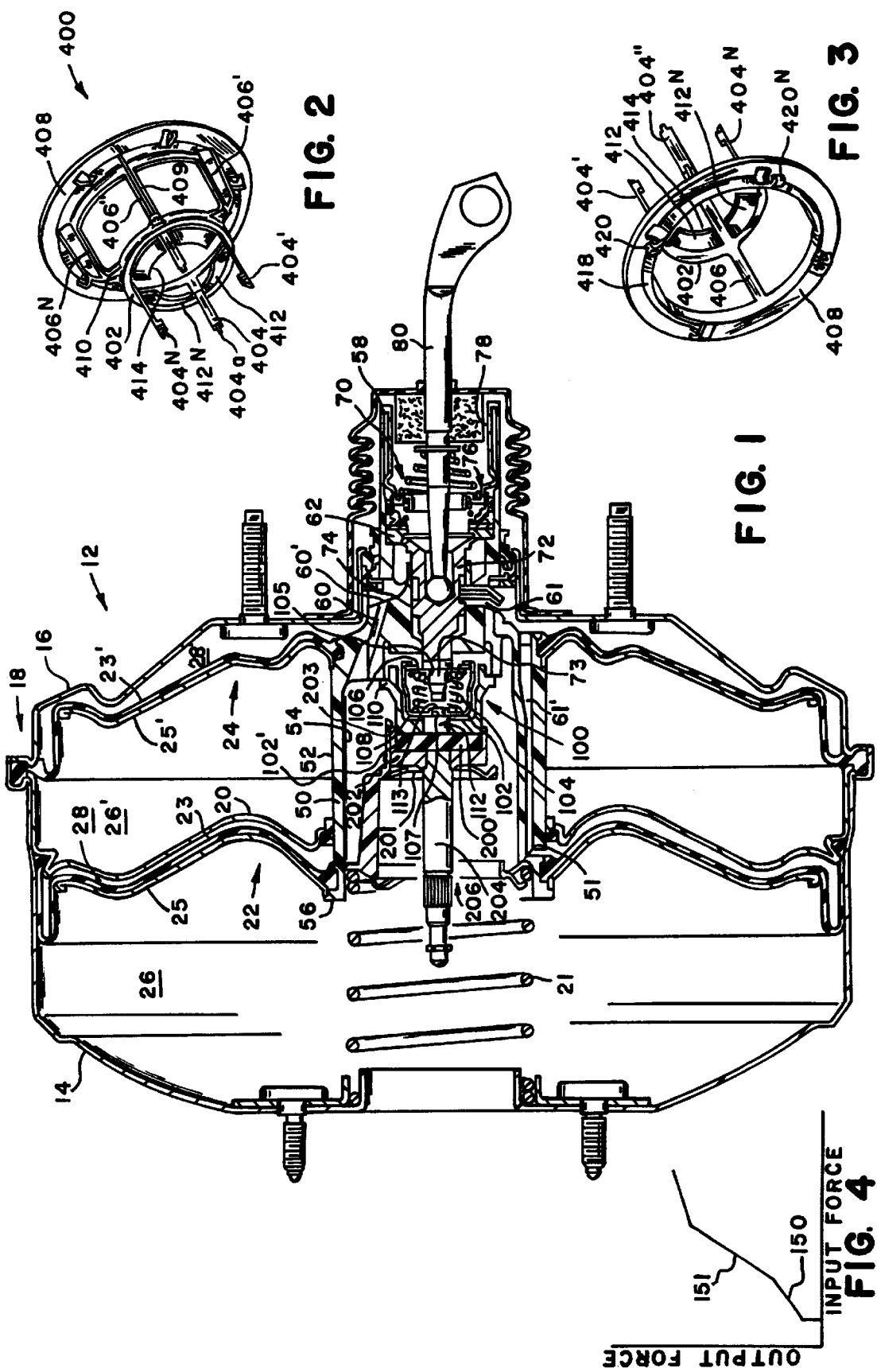

BRAKE BOOSTER AND ITS METHOD OF ASSEMBLY

BACKGROUND OF THE INVENTION

U.S. Pat. No. 5,233,911 discloses a typical tandem brake booster through which a force is developed to effect a brake application. In such a brake booster, corresponding first and second walls divide the interior into first and second front chambers and first and second rear chambers. The first front chamber is externally connected to a first source of fluid pressure by a conduit and internally directly connected to the second front chamber and to the first and second rear chambers by various passageways in a hub associated with the first and second walls. A control valve located in the hub is positioned such that the first fluid pressure is communicated in the first and second rear chambers through the passageways to define a rest or ready position. In responsive to an input force, the control valve is positioned such that a second fluid pressure is presented through a passageway to the first and second rear chambers to create a pressure differential across the first and second walls. This pressure differential acts on the first and second walls to develop an output force, which is provided to a master cylinder to assist in effecting a brake application. On termination of the input force, a return spring positions the control valve to a rest or ready location to define a first mode of operation where the second fluid is evacuated from the first and second rear chambers to provide for equalization of the first fluid pressure in the first and second rear chambers. This type vacuum brake booster functions in an adequate manner to provide an assist in effecting a brake application.

U.S. Pat. Nos. 4,409,885; 4,942,738; 5,313,796; 5,329,769 and 5,802,852 disclose brake booster and master cylinder arrangements wherein at least a portion of the master cylinder housing is positioned within the interior of the booster housing to define an integrated brake assembly. Such brake boosters operate in a satisfactory manner but because of their overall size occupies considerable under the hood space when installed in a vehicle. In this arrangement it is common for the brake boosters and master cylinders to manufactured in different locations and assembled as a central location. Unfortunately, the output push rod, which is part of the brake booster, must be separately shipped to the assembly location, as it is not always fixed to the movable wall.

In the vacuum brake boosters in the patents identified above a resulting output force produce in response to an output force follows a linear curve. In some applications it is desirable to modify the output force of a vacuum brake booster in a manner defined by the structure disclosure in U.S. Pat. No. 5,893,316 through a force transmitting assembly which includes a spring pack located between a reaction disc and plunger connected to an input push rod. In this vacuum brake booster, both the spring pack and push rod are separate items and separately installation in the vacuum brake booster before assembly on a vehicle. U.S. Pat. Nos. 4,892,027 and 4,898,073 disclose structure, which is designed to retain an output push rod within a brake booster.

SUMMARY OF THE INVENTION

A primary object of the present invention is to provide structure for aligning an output push rod with a holder of a spring pack in a bore of a valve body and thereby retaining an output push rod within a vacuum brake booster.

In the instant brake booster, a housing formed by joining a front shell with a rear shell has an interior divided by a movable wall assembly into at least a first front chamber and at least a first rear chamber. The movable wall assembly has a valve body with a cylindrical projection, which extends through the rear shell into the surrounding environment. A control valve which is located in an axial bore of the valve body has a first mode of operation wherein the front chamber which is permanently connected to a first source of pressure (vacuum) and is in communication with the rear chamber to provide for equal pressures in the front and rear chambers and a second mode of operation wherein the rear chamber is in selective communication with the surrounding environment (atmospheric pressure) to create a pressure differential across the movable wall assembly. An operational force created by a pressure differential which acts on the wall assembly is communicated through a reaction member into an output push rod. After the operational force overcomes a return spring, the output push rod moves pistons in a master cylinder to pressurize fluid therein. This pressurized fluid is supplied to wheel brakes to effect a brake application. The brake booster is characterized by a retainer for holding the output push rod within the vacuum booster. The retainer has a base with an axial opening, a first plurality of axial legs with hooks on the end thereof which extend in a first direction from the base and a second plurality of legs that extend in a second direction from the base that are connected to a support ring. A return spring acts on and holds the support ring against a shoulder on the valve body to locate the base of the retainer adjacent the holder such that tabs which form the axial opening in the retainer urge the reaction disc against the holder. At the same time the tabs hold the output push rod within the valve body such that a head of the output push rod is located adjacent the reaction member with the shaft of the output push rod located along the axis of the axial bore of the valve body and the return spring concentrically positioned with respect to the axial bore.

An advantage of the brake booster of the instant invention resides in a retainer, which holds a return spring and output push rod in a concentric position within an axial bore of a hub connected to a movable wall.

A further advantage of the present invention resides in ease of the manufacturing a brake booster whereby return spring means acts on a retainer to position and hold an output push rod and reaction disc against a holder of a spring pack prior to being assembled to a housing of a master cylinder.

BRIEF DESCRIPTION OF THE DRAWINGS

FIG. 1 is a sectional view of a vacuum brake booster made according to the principals of the present invention;

FIG. 2 is a rear perspective view of a guide and output push rod for the vacuum brake booster of FIG. 2;

FIG. 3 is a front perspective view of the guide and output push rod for the vacuum brake booster of FIG. 2; and FIG. 4 is a curve illustrating the operation of the brake booster of FIG. 1;.

DETAILED DESCRIPTION

FIG. 1 illustrates a brake booster 12 having a housing formed by joining a front shell 14 to a rear shell 16 through a locking arrangement 18. A partition arrangement 20 of the type disclosed in U.S. Pat. No. 3,897,718, engages a cylindrical body or hub 50 and with movable walls 22 and 24 separate the interior of the housing into front 26,26' and rear 28,28' chambers. The movable walls 22 and 24 are formed by diaphragms 23,23' and backing plates 25,25' which are fixed to the peripheral surface 52 of hub or valve body 50. Hub 50 has a stepped axial bore 54 which extends from a first end 56 located in the front chamber 26 to a second end 58 which passes through the rear shell 16 and into a surrounding environment. Hub 50 has a first series of passageways 60,60' through which the front chambers 26,26' are permanently connected to each other upstream of a valve seat 62 and a second series of passageways 61,61' through which the rear chambers 28,28' are selectively connected to each other downstream of vacuum seat 62. A control valve 70, of the type disclosed in U.S. Pat. 4,953,446, has a plunger 72 located on bearing surface 74 of hub 50, a poppet assembly 76 retained in the stepped axial bore 54 by sleeve 78 and a input push rod 80. The bearing surface 74 is concentric with and holds plunger 72 in an aligned axial position within the stepped axial bore 54.

A first reaction transmission member 100, includes a cylindrical holder 102 and a spring 104 which is caged between a first tubular member 106 and a second tubular member 108. The first reaction transmission member 100 which is located in axial bore 54 has an arcuate rib 110 that engages shoulder 51 on hub 50. In this position, an axial extension 73 of plunger 72 passes through a central opening 105 in the first tubular member 106 with a shoulder 71 thereon engaging end wall 106' of the first tubular member 106. An contact disc 112 which is located in an axial bore 101 of holder 102 has a projection 11 3 that extends through a central opening 107 in the second tubular member 108. The distance between the end 75 of extension 73 and end 115 of projection 113 is selected to establish a point whereby a relationship between input force applied by an operator to plunger 72 and the output force produced by movement of the walls 22, 24 shifts from a first function to a second function as shown by curve 150 in FIG. 4.

A second reaction transmitting member is defined by a disc 200 which is located in a cylindrical cup 202 attached to shaft 204 of the output push rod 206. The shaft 204 is connected to supply pistons in a master cylinder with an operational force to effect a brake application corresponding to the input force applied to plunger 72 by an operator.

The output push rod 206 is aligned in the stepped axial bore 54 of the hub or valve body 50 by guide means 400 shown in FIGS. 3 and 4 such that reaction disc 200 is held against face 102' of the holder 102 and contact disc 112 with the cylindrical cup 202 surrounding the peripheral cylindrical surface of the holder 102.

In more particular detail, guide means 400 includes a cylindrical base 402 with a first plurality of legs 404, 404' .... 404" that extend in a first axial direction, a second plurality of legs 406, 406' ... 406" that extend in a second axial direction and a plurality of arcuate tabs 412, 412' ... 412" which extend radially inward to define an axial opening 414. The first plurality of legs 404, 404' ... 404" each have a hook 404a on the end thereof while the second plurality of legs 406, 406' ... 406" terminate and merge into a support ring 408. Each of the second plurality of legs 406, 406' ... 406" have a central rib 409 that extends from support ring 408 to a radial extension 410 from base 402. Support ring 408 has an annular groove 412 which forms a seat for a return spring 21 which urges the movable walls 22 and 24 toward the rear shell 16. The return spring 21 acts on and holds the support ring 408 against a shoulder 51 of the hub or valve body 50 such that the arcuate tabs 412, 412' ... 412" act on the cylindrical cup 202 to hold disc 200 against contact disc 112 and holder 102. With support ring 408 located on shoulder 51 the first plurality of legs 404, 404' ... 404" engage the peripheral surface of the cylindrical cup 202 to hold shaft 204 in along the axis of bore 54 and in alignment with the input push rod 72.

METHOD OF ASSEMBLY

As is common with a tandem brake booster 12 of the type illustrated in FIG. 1, various components are pre-assembled and in accordance with present invention only that part of the assembly that is new will be described in detail.

Initially guide means 400 as illustrated in FIGS. 2 and 3 are obtained from a source. Guide means 400 has a cylindrical base 402 with an axial opening 414 defined by a series of arcuate tabs 412, 412' ... 412", a first plurality of axial legs 404, 404' ... 404" which extend in a first axial direction from the cylindrical base 402 each of which has a hook 404a on the end thereof, a second plurality of axial legs 406, 406' ... 406" which extend in a second direction from the cylindrical base 402 to a support ring member 408. The cylindrical base 402 has a smaller diameter than the support ring member 208 and as a result the second plurality of legs 406, 406' ... 406" extend along a slight taper or angle with respect to a perpendicular cylinder with respect to the cylindrical base 402. A rib 409 located along the center of each of the second plurality of legs 406, 406' ... 406" adds to the rigidity of the structure as shown in FIGS. 3 and 4.

After the guide means 400 has been obtained it is combined an output push rod 206 by pushing shaft 204 through the axial opening 414 until a first surface 201 of the cylindrical cup or head 202 engages the series of arcuate tabs 412, 412' ... 412" at which time hooks 404a on the first series of legs 404, 404' ... 404" snap over a second surface 203 to hold and join the guide means 400 with the output push rod 206 and thereby align shaft 204 with the axis of the axial opening 414. The guide means 400 is thereafter placing in bore 54 with the second plurality of legs 406, 406' ... 406" or at least the reinforcing rib 409 associated therewith engaging the bore 54 of the valve body 50 to align shaft 204 with the axis of bore 54. The guide is moved into bore 54 until the support ring 408 engages shoulder 51 on the valve body 50 at the same time the hooks 404a engage the cylindrical surface of holder 102 to align cylindrical cup 202 and disc 200 retained therein a position adjacent the holder 102 such that shaft 204 is in axial alignment with plunger 72. Return spring 21 is then attached to the support ring 408 by a series resilient projections 420,420', ... 420" and front shell 12 placed on the rear shell 14 before a crimp is made to establish the locking arrangement 18 to complete the assembly.

Mode of Operation

In response to an input force applied to input rod 80, plunger 72 moves to allow poppet member 76 to engage seat 54 and terminate communication between the front chambers 26,26' to the rear chambers 28,28' through the stepped axial bore 54. Further movement of plunger 72 moves face 73 away from the poppet member 76 to allow air from the surrounding environment to be communicated to the rear chambers 28,28' by way of passageways 61,61' to create a pressure differential across walls 22,24. This pressure differential acts on walls 22,24 to develop an operational force that is communicated through valve body 50 into shaft 204 through reaction disc 200. After overcoming the force of return spring 21, the operational force moves output push rod 206 which in turn moves pistons in the master cylinder to pressurize fluid in the master cylinder. The fluid pressurized by the master cylinder pistons is communicated to the wheel brakes to effect a corresponding brake application. The output force developed as a result of an input applied to plunger 72 is defined by curve 150 and when the output force reaches a certain level the reaction disc 200 acts on contact disc 112 to overcome spring 104 to allow contact disc 200 to engage axial extenuation 73 on plunger and change the ratio of input to output in a manner defined by section 151 of curve 150. When the input force on plunger 72 terminates, return spring 21 returns the movable walls 22,24 to the position illustrated in FIG. 1 and the plurality of arcuate tabs 412, 412' . . . 412" act on and hold the cylindrical cup 202 in engagement with the holder 102.

We claim:

1. A brake booster having a valve body slidably located within a shell, a valve mechanism including a plunger retained in a bore of the valve body, an input member for moving said plunger within said bore to change a flow path between a front chamber and a rear chamber to create a pressure differential which after overcoming a return spring moves a wall to develop an output force, a holder mounted on the valve body for locating a first reaction transmitting assembly including a first retainer separated from a second retainer by a reaction spring within said bore, said first retainer being connected to said input member, a contact disc retained by said holder and connected to said second retainer, an output member having a cylindrical cup which slidably engages said holder for positioning a reaction disc adjacent said holder and said contact disc, said output force being communicated from said valve body to the output member through said holder and reaction disc to move a piston in a master cylinder and effect a brake application, said output member transmitting an initial reaction force corresponding to the resistance to movement of said piston to said input member by way of said reaction disc, contact disc, second retainer, reaction spring and first retainer until said reaction force overcomes said reaction spring and allows said contact disc to engage said plunger and directly transmit a reaction force from the reaction disc to oppose the input force applied by said input member, the improvement comprising guide means having a ring held against a shoulder of said valve body by said return spring and a first plurality of axial legs that connect said ring to a cylindrical base, said cylindrical base having a plurality of arcuate tabs that engage said cylindrical cup to hold said reaction disc against said holder.

2. The brake booster as recited in claim 1 wherein said guide further includes a second plurality of axial legs that extend from said cylindrical base that engage said cylindrical cup to assist in aligning said cylindrical cup in said bore.

3. A method of assembling an output member within a bore of a valve body of a vacuum brake booster wherein a reaction disc engages a holder of a reaction transmitting arrangement connected to a plunger of an input member comprising the steps of:

obtaining a guide from a source, said guide having a cylindrical base with an axial opening defined by a series of arcuate tabs, a first plurality of axial legs extending in a first direction from said cylindrical base with hooks on the end thereof, a second plurality of axial legs extending in a second direction from the cylindrical base, and a ring member connected to said second plurality of legs;

pushing a shaft of said output member through said axial opening of said guide until a first surface of a head on said output member engages said series of arcuate tabs to allow said hooks to engage a second surface of said head and allow said first plurality of legs to hold and align said shaft on the axis of said axial opening;

placing said guide with said shaft attached thereto in said bore, said second plurality of legs engaging said bore of said valve body to align said shaft with the axis of said bore; and moving said guide into said bore until said ring engages a shoulder on said valve body and said hooks engage said holder and align a cylindrical cup of said head and said reaction disc in a position adjacent said holder such that said shaft is in axial alignment with said plunger.

4. The method as recited in claim 3 further including the step of holding said ring against said shoulder allows said arcuate tabs on said cylindrical base resiliently act on said head to hold said reaction disc against said holder.

5. The method as recited in claim 4 wherein said step of holding said ring against said shoulder includes locating a coil on a return spring in a groove on said ring.

6. The method as recited in claim 5 wherein said step of moving said guide in said bore is enhanced by said second plurality of legs which engage said bore to assist in the alignment of said shaft with said plunger.

7. The method as recited in claim 6 wherein said step of locating said coil on said ring is achieved by a plurality of resilient projections which snap around said coil.

8. The output member assembled by the method as recited in claim 7.

\* \* \* \* \*